(12) United States Patent
Yamauchi (10) Patent No.: US 11,876,942 B2
(45) Date of Patent: Jan. 16, 2024

(54) INFORMATION PROCESSING APPARATUS, INFORMATION PROCESSING METHOD AND NON-TRANSITORY RECORDING MEDIUM

(71) Applicant: Shin Yamauchi, Tokyo (JP)

(72) Inventor: Shin Yamauchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/948,252

(22) Filed: Sep. 20, 2022

(65) Prior Publication Data

US 2023/0100575 A1    Mar. 30, 2023

(30) Foreign Application Priority Data

Sep. 30, 2021   (JP) ................ 2021-162103

(51) Int. Cl.
*G06K 15/00*   (2006.01)
*G06K 15/02*   (2006.01)
*H04N 1/32*    (2006.01)
*H04N 1/00*    (2006.01)
*G06F 3/0482*  (2013.01)

(52) U.S. Cl.
CPC ....... *H04N 1/32523* (2013.01); *G06F 3/0482* (2013.01); *H04N 1/00413* (2013.01); *H04N 1/00498* (2013.01)

(58) Field of Classification Search
CPC .......... H04N 1/32523; H04N 1/00413; H04N 1/00498; G06F 3/0482; G06F 3/04842
See application file for complete search history.

(56) References Cited

U.S. PATENT DOCUMENTS

2010/0188697 A1*  7/2010  Maeda ............... H04N 1/32058
                                                                  358/1.15
2010/0306250 A1   12/2010  Mizunashi

FOREIGN PATENT DOCUMENTS

JP    2010-171831    8/2010
JP    2010-262299    12/2010

* cited by examiner

*Primary Examiner* — Moustapha Diaby
(74) *Attorney, Agent, or Firm* — XSENSUS LLP (57) ABSTRACT

An information processing apparatus, an information processing method, and a non-transitory recording medium. The information processing apparatus searches for one or more pieces of data including name information, receives an operation from a user, controls a user interface to display a plurality of first operation components indicating initials of the name information, in response to the operation on a particular one of the first operation components, controls the user interface to display one or more second operation components associated with the particular first operation component simultaneously with the first operation component, and in response to the operation on a particular one of the second operation components, control the user interface to display the data including the name information associated with the particular second operation component.

20 Claims, 8 Drawing Sheets

INFORMATION PROCESSING APPARATUS, INFORMATION PROCESSING METHOD AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-162103, filed on Sep. 30, 2021, in the Japan Patent Office, the entire disclosure of which is hereby incorporated by reference herein.

BACKGROUND

Technical Field

The present disclosure relates to an information processing apparatus, an information processing method, and a non-transitory recording medium.

Related Art

In an information processing apparatus such as an image forming apparatus, a user interface has been developed that narrows down the number of destinations by operating multiple keys in sequence for a purpose of searching for a desired destination from data in an address book.

SUMMARY

Embodiments of the present disclosure describe an information processing apparatus, an information processing method, and a non-transitory recording medium. The information processing apparatus searches for one or more pieces of data including name information, receives an operation from a user, controls a user interface to display a plurality of first operation components indicating initials of the name information, in response to the operation on a particular one of the first operation components, controls the user interface to display one or more second operation components associated with the particular first operation component simultaneously with the first operation component, and in response to the operation on a particular one of the second operation components, control the user interface to display the data including the name information associated with the particular second operation component.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a detailed description is given of several embodiments of an information processing apparatus, an information processing method, and an information processing system to which a program is applied, with reference to the accompanying drawings.

Figure 1:
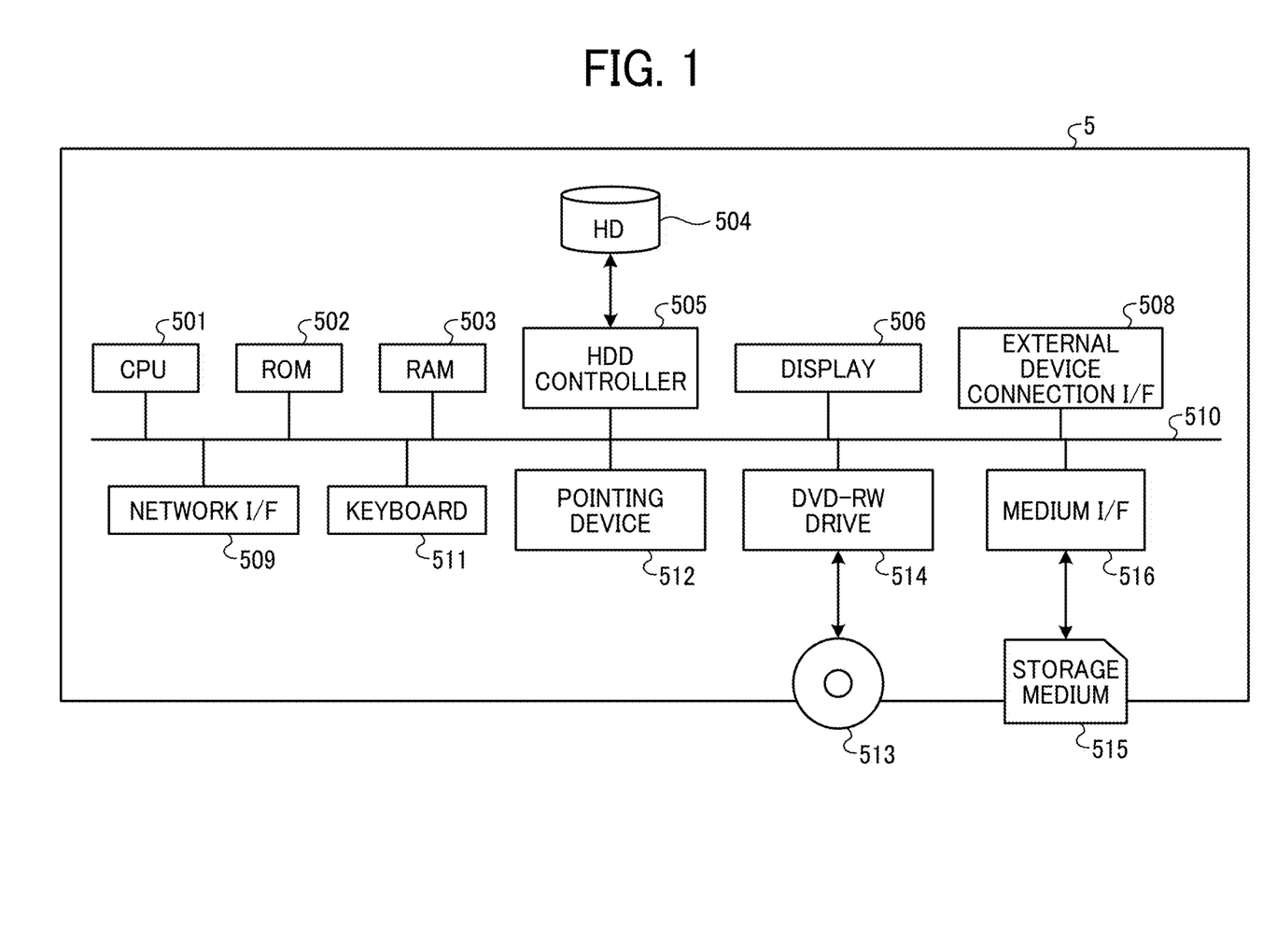
FIG. 1 is a diagram illustrating an example of a hardware configuration of a server according to embodiments of the present disclosure.

The information processing system according to the present embodiment includes an MFP 9 (see FIG. 2) and a server 5 (see FIG. 1). The MFP 9 is an example of an information processing apparatus and includes a scan function, a transmission function, a display control function, and the like.

Here, the scan function is a function for scanning a document. Further, the transmission function is a function of transmitting scan data scanned by the scan function to an external device. Further, the display control function is a function of displaying a screen for searching desired data from data to be searched (for example, an address book) on a control panel.

The server 5 is a server accessible from the information processing apparatus such as the MFP 9, and stores the data to be searched (for example, the address book). In the information processing system according to the present embodiment, the server 5 is provided since the server 5 stores the data to be searched, but in the case the MFP 9 stores the data to be searched, the server 5 may not be provided.

FIG. 1 is a diagram illustrating an example of a hardware configuration of the server according to embodiments of the present disclosure. The example of the hardware configuration of the server 5 according to the present embodiment is described.

As illustrated in FIG. 1, the server 5 is implemented by a computer and includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls entire operation of the server 5. The ROM 502 stores a control program such as an initial program loader (IPL) to boot the CPU 501. The RAM 503 is used as a work area for the CPU 501. The 11D 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory or a printer. The network I/F 509 is an interface for performing data communication using a communication network. The data bus 510 is an address bus or a data bus, which electrically connects the elements in FIG. 1 such as the CPU 501.

The keyboard 511 is one example of an input device provided with a plurality of keys for enabling a user to input characters, numerals, and various instructions. The pointing device 512 is an example of the input device that allows the user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

Figure 2:
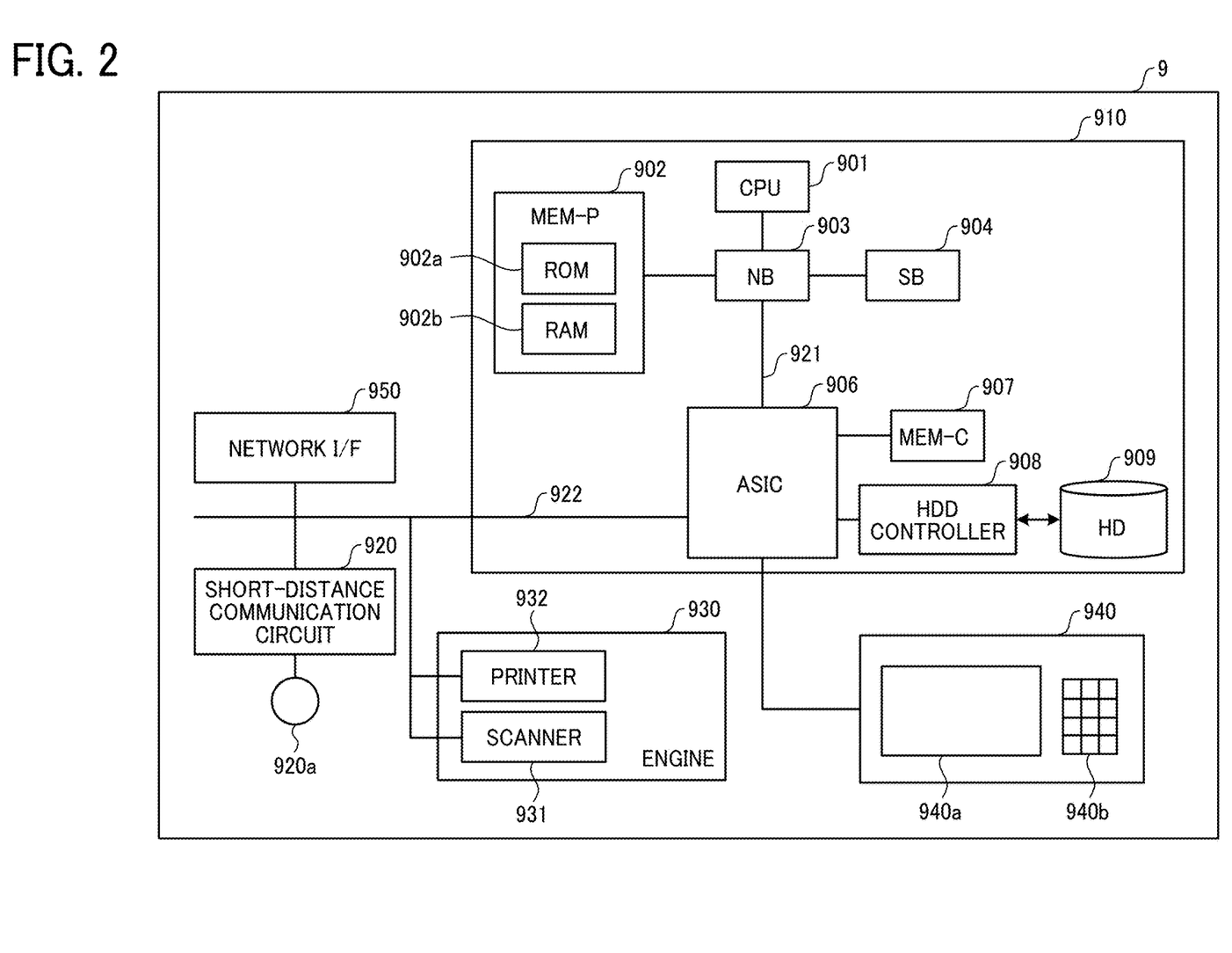
FIG. 2 is a diagram illustrating an example of a hardware configuration of a multi-function peripheral (MFP) according to embodiments of the present disclosure.

FIG. 2 is a diagram illustrating an example of a hardware configuration of the MFP according to embodiments of the present disclosure. As illustrated in FIG. 2, the MFP 9 includes a controller 910, a short-range communication circuit 920, an engine 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907 as a storage unit, an HDD controller 908, and an HD 909 as the storage unit. The NB 903 and the ASIC 906 are connected through an Accelerated Graphics Port (AGP) bus 921.

The CPU 901 is a processor that performs overall control of the MFP 9. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902*a* which is a memory for storing programs and data that implements each function of the controller 910, and a RAM 902*b* which is used as a memory for developing programs and data and a memory for drawing at the time of memory printing. The program stored in the ROM 902*a* may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a copy image buffer and a code buffer. The HD 909 is a storage that stores image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes an antenna for short-range communication circuit 920*a*. The short-range communication circuit 920 is a communication circuit that communicates in compliance with the near field communication (NFC) (Registered Trademark), the BLUETOOTH (Registered Trademark), and the like.

The engine 930 includes a scanner 931 and a printer 932. The control panel 940 includes a display panel 940*a* implemented by, for example, a touch panel that displays current settings or a selection screen and receives a user input and operation panel 940*b* that includes a numeric keypad that receives set values of various image forming parameters such as image density parameter and a start key that receives an instruction to start copying. The controller 910 controls entire operation of the MFP 9. For example, the controller 910 controls rendering, communication, or inputs to the control panel 940. The scanner 931 or the printer 932 includes an image processor to perform error diffusion processing, gamma conversion processing, and the like.

In response to an instruction to select a specific application through the control panel 940, for example, using a mode switch key, the MFP 9 selectively performs a document box function, a copy function, a print function, and a facsimile function. The document box mode is selected when the document box function is selected, the copy mode is selected when the copy function is selected, the print mode is selected when the printer function is selected, and the facsimile mode is selected when the facsimile function is selected.

The network I/F 950 is an interface for performing data communication using the communication network. The short-range communication circuit 920 and the network I/F 950 are electrically connected to the ASIC 906 through the PCI bus 922.

Figure 3:
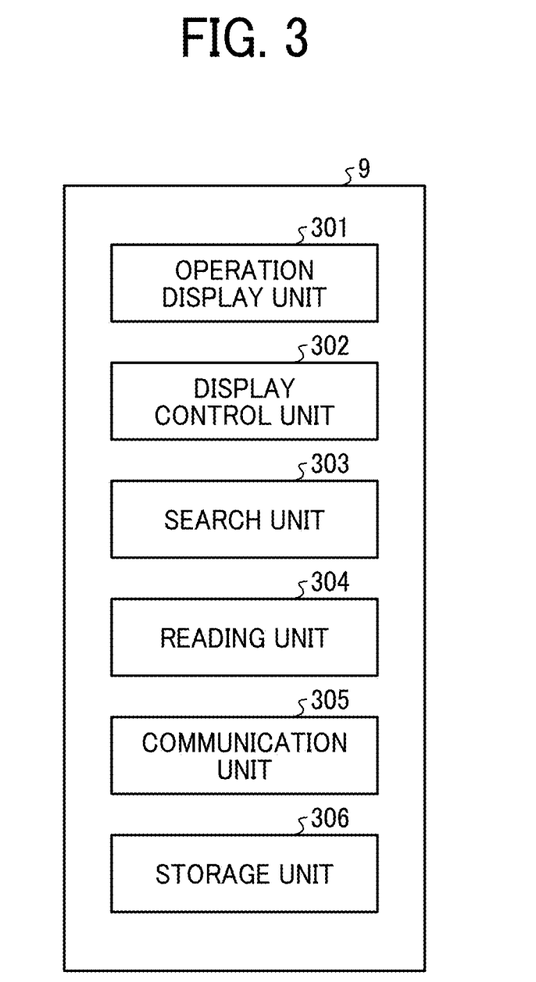
FIG. 3 is a block diagram illustrating an example of a functional configuration of the MFP according to embodiments of the present disclosure.

FIG. 3 is a block diagram illustrating an example of a functional configuration of the MFP according to the present embodiment. The example of the functional configuration of the MFP 9 according to the present embodiment is described with reference to FIG. 3.

As illustrated in FIG. 3, the MFP 9 according to the present embodiment includes an operation display unit 301, a display control unit 302, a search unit 303, a reading unit 304, a communication unit 305, and a storage unit 306.

The operation display unit 301 is the control panel 940 or the like, and is an example of an operation display unit that receives an operation from the user. In the present embodiment, the operation display unit 301 receives selection of data (an example of the first data, for example, a destination) among the data searched by the search unit 303 described below. In alternative to the control panel 940, the operation display unit 301 may be implemented by any desired user interface that interacts with the user to input or output information from or to the user.

The display control unit 302 is an example of a display control unit that controls the display of various information on the control panel 940. The search unit 303 is an example of a search unit that searches for one or more items of desired data (for example, a destination) from the data to be searched (for example, the address book) based on the user's operation received by the control panel 940. Here, the desired data is data such as address information including name information such as the destination.

The reading unit 304 is the scanner 931 or the like, which scans a document and generates scan data. The communication unit 305 is an example of a transmission unit that transmits electronic data such as scan data generated by the reading unit 304 to a desired destination based on address information such as the destination included in the data received by the operation display unit 301. Further, the communication unit 305 communicates with the external device such as the server 5. The storage unit 306 stores data to be searched (for example, the address book).

Figure 4:
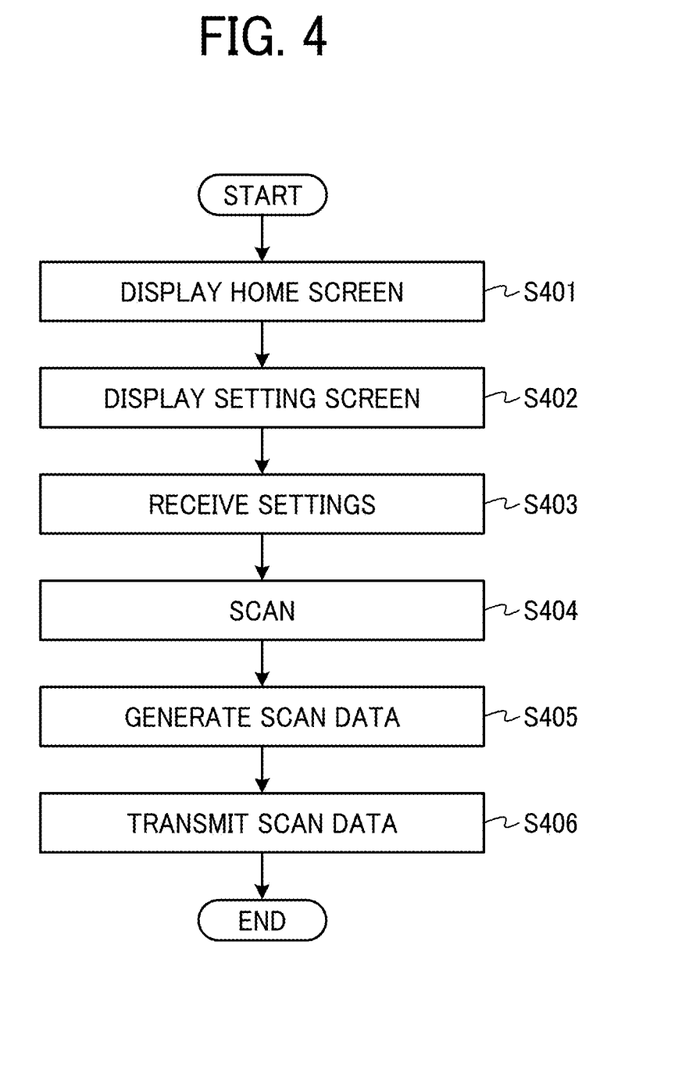
FIG. 4 is a flowchart illustrating an example of a destination search process for transmitting electronic data in the MFP according to embodiments of the present disclosure.

FIG. 4 is a flowchart illustrating an example of a destination search process for transmitting electronic data in the MFP according to embodiments of the present disclosure. With reference to FIG. 4, the example of the destination search process for transmitting the electronic data (for example, the scan data generated by the reading unit 304) in the MFP 9 according to the present embodiment is described.

The user of the MFP 9 registers the address book data (an example of the data to be searched) in the MFP 9 or the server 5 in advance. Here, the address book data may be manually input (registered) by the user from the operation display unit 301, or may be registered by importing the data from the external device into the MFP 9. Further, the address book data includes data of one or more destinations including name information. The destination data includes attribute information such as a destination name, a phonetic sign of the destination name, an address (for example, an e-mail address, a fax number), a company name, and a department in association with each other.

In step S401, the display control unit 302 displays a home screen on the operation display unit 301. Here, the home screen is a screen for displaying a list of icons of one or more applications such as a scan application, a print application (printer function), a copy application (copy function), and a facsimile application (facsimile function). The user starts the scan application by selecting the scan application on the home screen.

In response to start of the scan application, the display control unit 302 displays the setting screen on the operation display unit 301 in step S402. Here, the setting screen is a screen in which a plurality of settings such as scan settings and transmission destination settings are displayed so as to be changeable. Scan settings include color or monochrome settings, double-sided or single-sided settings, density settings, file format settings, scanned document size settings, document set orientation settings, resolution settings, file name settings, and the like.

The user sets various settings on the setting screen. In step S403, the operation display unit 301 receives the settings of various setting items on the various setting screens. For example, the operation display unit 301 receives a change in the transmission destination settings. The display control unit 302 accesses the address book data stored in the MFP 9, or the address book data stored in the server 5 and displays the setting screen for selecting the destination included in the address book data as the transmission destination settings. The destination to be set in the transmission destination settings may include a storage area of a storage server and the MFP 9 in addition to the address included in the address book.

In step S404, in response to a pressing of a start button included in the setting screen, the reading unit 304 scans the document according to the scan settings set on the setting screen. In step S405, the reading unit 304 generates scan data based on the scanning result of the original. In the present embodiment, the operation display unit 301 accepts the transmission destination settings before scanning the original, but the transmission destination settings may be received after scanning the original.

In step S406, the communication unit 305 transmits scan data based on the transmission destination settings received on the setting screen. For example, the communication unit 305 sends an e-mail with scan data attached to the e-mail address set as the transmission destination setting. For example, the communication unit 305 transmits the scan data to the server 5 and instructs the information storage device set as a transmission destination setting to store the scan data. Further, the communication unit 305 stores the scan data in the storage area of the information processing apparatus such as the MFP 9, set as the transmission address setting.

Figure 5:
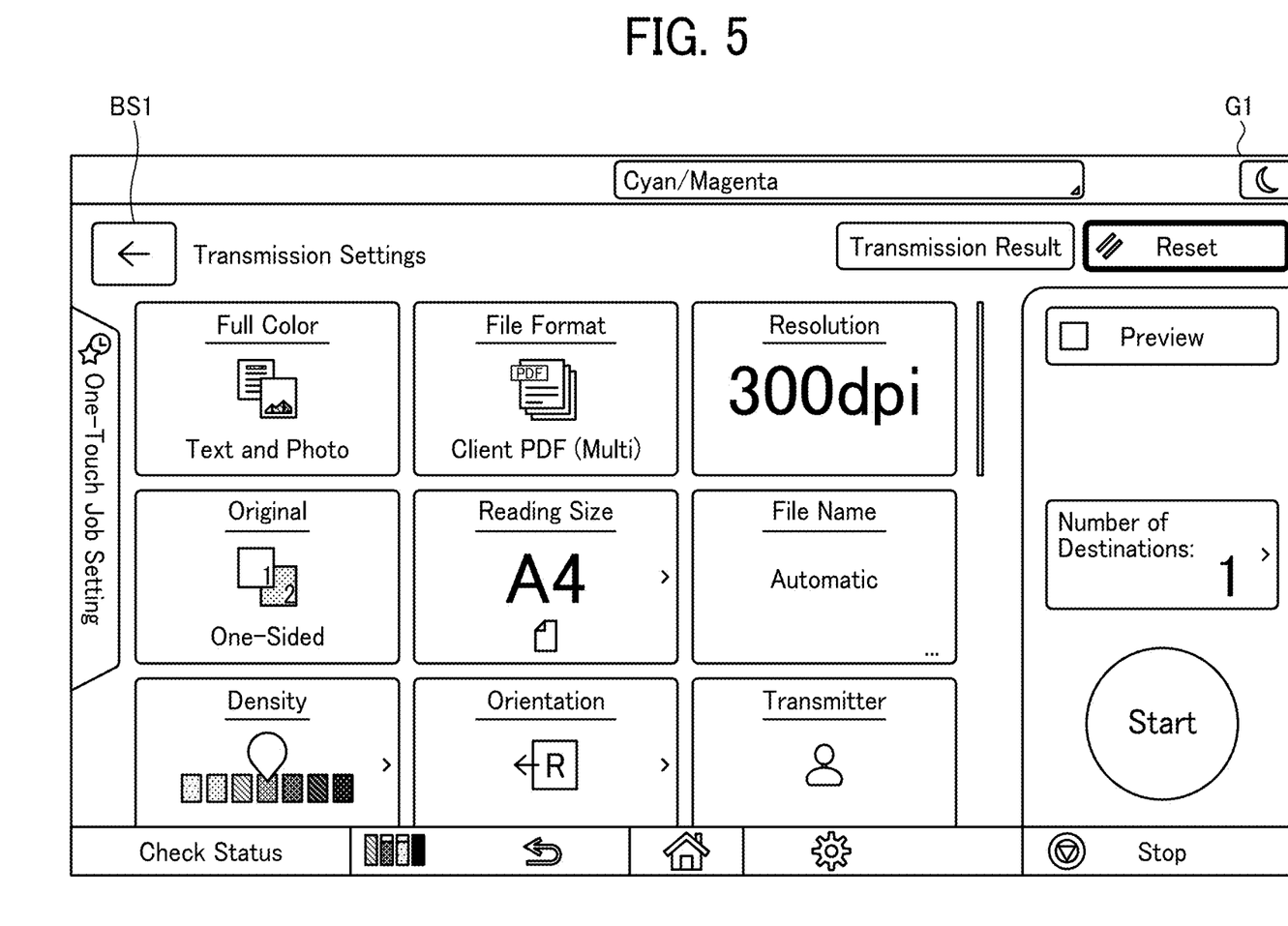
FIG. 5 is a diagram illustrating an example of a setting screen to be displayed on the MFP according to embodiments of the present disclosure.
Figure 6:
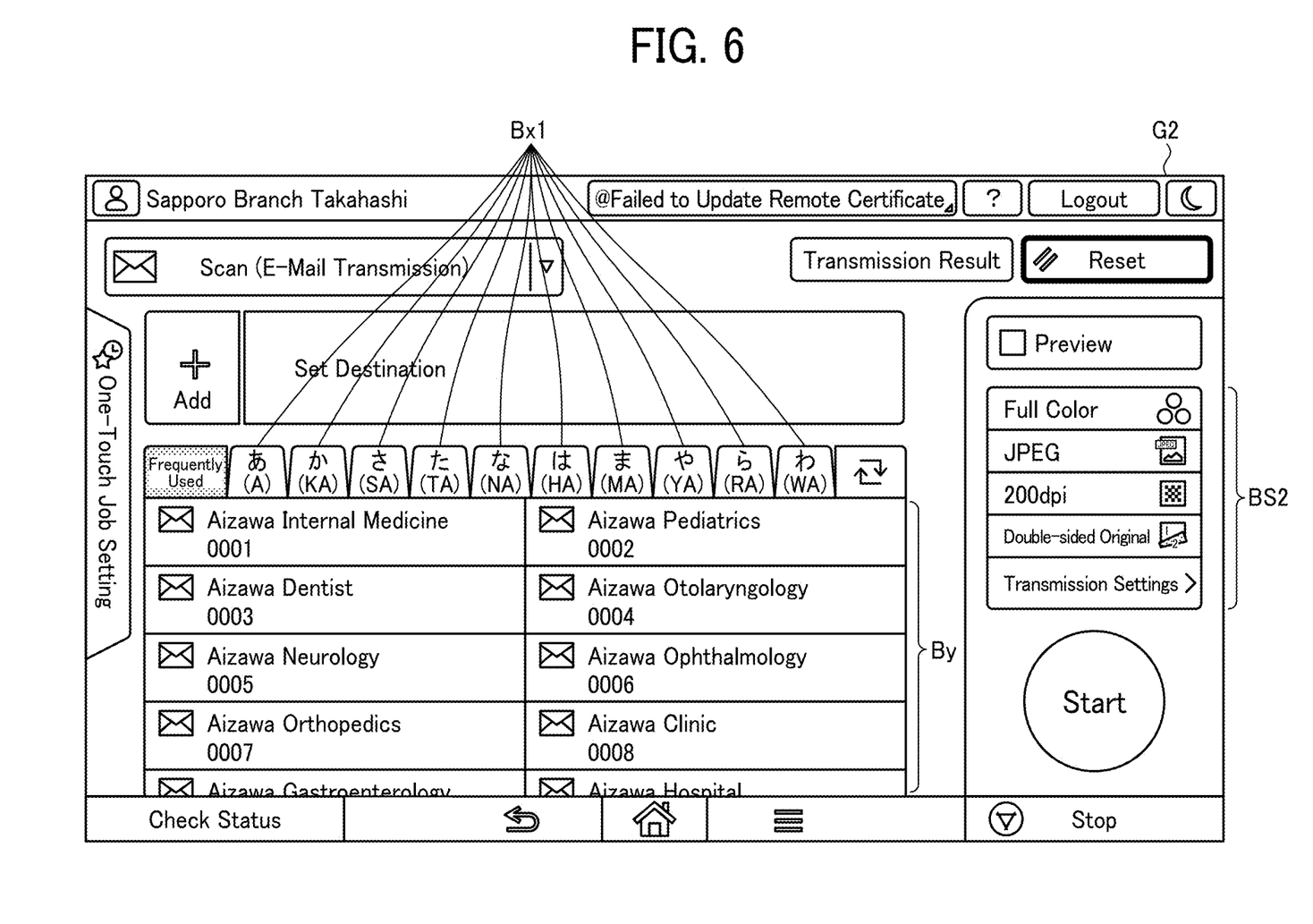
FIG. 6 is a diagram illustrating another example of the setting screen to be displayed on the MFP according to embodiments of the present disclosure.

FIGS. 5 and 6 are diagrams illustrating examples of the setting screen at the time of printing in the MFP according to the present embodiment. With reference to FIGS. 5 and 6, the examples of the setting screen to be displayed in the MFP 9 according to the present embodiment is described.

In the present embodiment, the display control unit 302 displays the setting screen G for setting color or monochrome settings (for example, full color), file format settings (for example, Joint Photographic Experts Group (JPEG)), and the like on the operation display unit 301 as illustrated in FIG. 5. In response to a pressing of a button BS1 displayed on the setting screen G1 for instructing the setting of the transmission destination setting, the display control unit 302 displays the setting screen G2 for setting the transmission destination setting on the operation display unit 301, as illustrated in FIG. 6. Further, in the present embodiment, the display control unit 302 displays the setting screen G2 including a plurality of first initial buttons (an example of the first operation component) Bx1 indicating the initial of the name information (for example, the name information of the destination) included in the address book data on the operation display unit 301.

In response to a pressing of a button BS2 displayed on the setting screen G2 for instructing the setting such as color or monochrome, the display control unit 302 displays the setting screen G1 on the operation display unit 301 again as illustrated in FIG. 5. In the present embodiment, the display control unit 302 transitions the setting screen to be displayed on the operation display unit 301 to the setting screen G1 or the setting screen G2 in response to the pressing of the buttons BS1 and BS2, but the present disclosure is not limited to this example. For example, the display control unit 302 may transition the setting screen to the setting screen G1 or the setting screen G2 in response to a flick operation on the setting screens G1 and G2.

Figure 7:
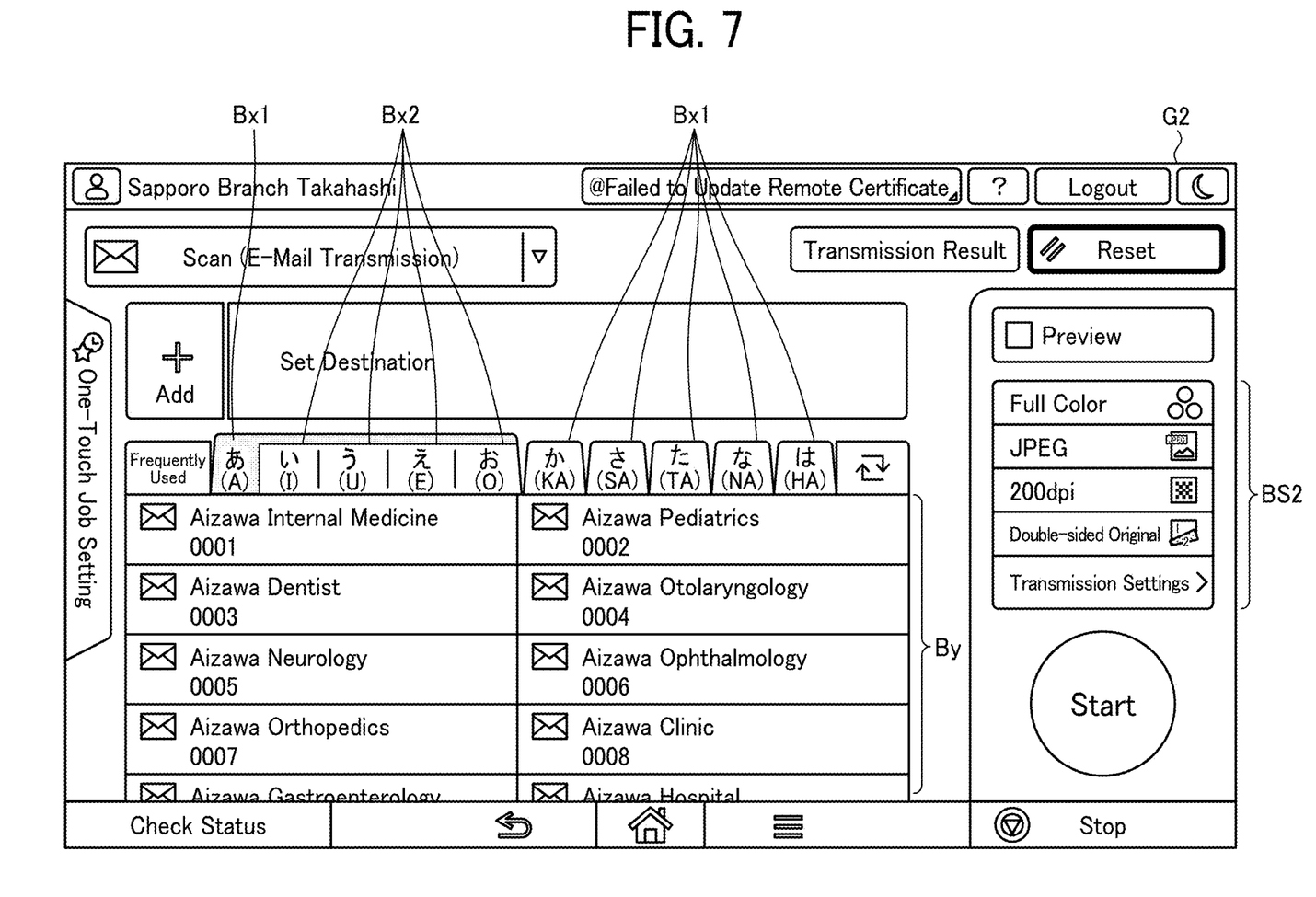
FIG. 7 is a diagram illustrating an example of a destination display process in the MFP according to embodiments of the present disclosure.

FIG. 7 is a diagram illustrating an example of a destination display process in the MFP according to embodiments of the present disclosure. With reference to FIG. 7, the example of the destination display process in the MFP 9 according to the present embodiment is described.

In the present embodiment, in response to a pressing (operation) of the first initial button Bx1 (for example, the first initial button Bx1 labeled "A"), the display control unit 302 displays the setting screen G2 including a destination button By to select a destination indicated by the first initial button Bx1 (labeled, for example, "A"). In the present embodiment, the first initial button Bx1 is indicated by the initial of each column from the "A" column to the "WA" column in the Japanese syllabary, but the present disclosure is not limited to this example, and the initial may be indicated in alphabet and the like.

Further, in the present embodiment, in response to the pressing of the first initial button Bx1, the display control unit 302 displays the setting screen G2 displayed integrally with the first initial button Bx1, displaying one or more second initial buttons Bx2 (an example of the second operation component) associated with the first initial button Bx1. For example, in response to a pressing of the first initial button Bx1 labeled "A" included in the setting screen G2, the display control unit 302 displays the second initial buttons Bx2 labeled with the initials "I", "U", "E", and "O" which belong to the "A" column integrated with the first initial button Bx1 labeled "A". Specifically, on the second initial buttons Bx2, letters belonging to the column of the first initial button Bx1 are displayed. In this disclosure, the expression "integrally displayed" or "integrated with" is used to indicate, as one example, that different components (such as different buttons) are displayed simultaneously.

Further, in the present embodiment, the display control unit 302 may highlight with color or the like, the first initial button Bx1 selected (operated) by the user (for example, the first initial button Bx1 labeled "A") from among the plurality of first initial buttons Bx1. Further, in the present embodiment, the display control unit 302 may display the second initial button Bx2 adjacent to the left side, upper side, or lower side of the pressed first initial button Bx1. For example, as illustrated in FIG. 7, the display control unit 302 may display the second initial buttons Bx2 (for example, the second initial buttons Bx2 labeled "I", "U", "E", and "O") linked to the first initial button Bx1 (for example, the first initial button Bx1 labeled "A") side by side along the display direction (arrangement direction) of the plurality of first initial buttons Bx1. That is, the display control unit 302 displays the first initial button Bx1 in a preset display area (hereinafter referred to as an initial button display area, an example of a first area). Then, in response to a pressing of the first initial button Bx1, the display control unit 302 preferably displays the second initial button Bx2 in the initial button display area.

Also, in the present embodiment, in response to the pressing of the first initial button Bx1 or the second initial button Bx2, the display control unit 302 displays the setting screen G2 including a list of destination buttons By for selecting a destination (an example of data including name information) associated with the first initial button Bx1 or the second initial button Bx2. For example, in response to the pressing (operation) of the first initial button Bx1 labeled "A", the display control unit 302 displays, on the operation display unit 301, a setting screen G2 including a list of destination buttons By for destinations including names starting with the initial "A" (or destinations starting with the initial "A" in phonetic syllabary). Specifically, the display control unit 302 displays the destination button By of the destination including the initial of the pressed first initial button Bx1 or second initial button Bx2, and hide the destination button By of the destination not including the initial of the pressed first initial button Bx1 or second initial button Bx2. In response to a flick operation or the like in the display area of the list of destination buttons By to instruct display of a list of other destination buttons By, the display control unit 302 hides the destination button By of the destination that does not have the initial of the pressed first initial button Bx1 or second initial button Bx2.

In another example, the display control unit 302 may display the destination button By of the destination including the initial of the pressed first initial button Bx1 or the second initial button Bx2 at the top, and may display the pressed first initial button Bx1 or the destination button By for a destination that does not include the initial of the second initial button Bx2 at the end. In this example, in response to a flick operation or the like in the display area of the list of destination buttons By to instruct display of a list of other destination buttons By, the display control unit 302 may display a setting screen G2 including a list of destination buttons By for destinations that do not have the initial of the pressed first initial button Bx1 or second initial button Bx2.

Further, in the present embodiment, in response to the pressing of the first initial button Bx1 or the second initial button Bx2, the display control unit 302 displays the destination button By in the destination display area (an example of a second area) that does not overlap with the initial button display area in the setting screen G2.

Further, in the present embodiment, in response to the pressing of the first initial button Bx1, the display control unit 302 may hide a part of the first initial button Bx1 other than the target first initial button Bx1 (an example of a target first operation component) that is the pressed first initial button Bx1. For example, in response to the pressing of the first initial button Bx1 labeled "A", the display control unit 302 hides the first initial buttons Bx1 labeled "MA", "YA", "RA", "WA" and a part of the first initial button Bx1 labeled "HA". This allows the user to visually recognize that the first initial buttons Bx1 of the columns after the column "HA" is hidden.

In this example, the display control unit 302 displays the first initial buttons Bx1 (for example, the first initial buttons Bx1 labeled "KA", "SA", "TA", and "NA") in the area that was displaying the first initial buttons Bx1 other than the pressed first initial button Bx1 (for example, the first initial buttons Bx1 labeled "MA", "YA", "RA", and "WA"). Furthermore, the display control unit 302 displays the second initial buttons Bx2 integrally with the target first initial button Bx1 in the initial button display area.

Further, in response to the flick operation (for example, a flick operation in the horizontal direction) is performed in the initial button display area to instruct display of another first initial button Bx1, the display control unit 302 redisplays the hidden first initial button Bx1 in the initial button display area.

Further, in the present embodiment, the display control unit 302 integrally displays the pressed first initial button Bx1 and second initial button Bx2. As a result, the movement of the user's line of sight when searching for and narrowing down desired destination from the address book data in the MFP 9 is reduced. As a result, the user's convenience when retrieving the desired destination from the address book data in the MFP 9 is improved. Here, integrally displaying the first initial button Bx1 and the second initial button Bx2 indicates that the first initial button Bx1 and the second initial button Bx2 are displayed in such a manner that the buttons are associated with each other.

For example, display integrally includes displaying the first initial button Bx1 and the second initial button Bx2 without a gap. In other words, in response to the pressing of the first initial button Bx1, the display control unit 302 displays the second initial button Bx2 at a position within the initial button display area and adjacent to the pressed first initial button Bx1. In this case, the display control unit 302 displays each of the plurality of first initial buttons Bx1 with a gap in between.

In addition, display integrally includes displaying highlight display component (for example, yellow highlight display component) from the top of the first initial button Bx1 (for example, the first initial button Bx1 labeled "A") to the end of the second initial button Bx2 (for example, the second initial button Bx2 labeled "O"). Specifically, in response to the pressing of the first initial button Bx1, the display control unit 302 displays each of the second initial buttons Bx2 connected (in other words, without a gap) to at least a part of the first initial button Bx1. As a result, a group of second initial buttons Bx2 is linked to the pressed first initial button Bx1 (for example, first initial button Bx1 labeled "A") and the range of the first initial button Bx1 and the second initial buttons Bx2 in the column "A" is easily recognized visually.

An example to display the corresponding second initial buttons Bx2 linked to the first initial button Bx1 (for example, the second initial buttons Bx2 labeled "I", "U", "E", and "O") on the setting screen G2 in response to the pressing of the first initial button Bx1 (for example, the first initial button Bx1 labeled "A") is described but the present embodiment is not limited to this example. In this example, in the case the destination associated with the second initial button Bx2 is not included in the address book data, the display control unit 302 may hide the second initial button Bx2 associated with a destination not included in the address book data.

For example, in the case no destination linked to the second initial button Bx2 labeled "I" (or destinations linked to the phonetic initial "I") are registered in the address book data, the display control unit 302 may not display the second initial button Bx2 labeled "I", and may display the second initial buttons Bx2 labeled "U", "E", and "O" in response to the pressing of the first initial button Bx1 labeled "A".

Figure 8:
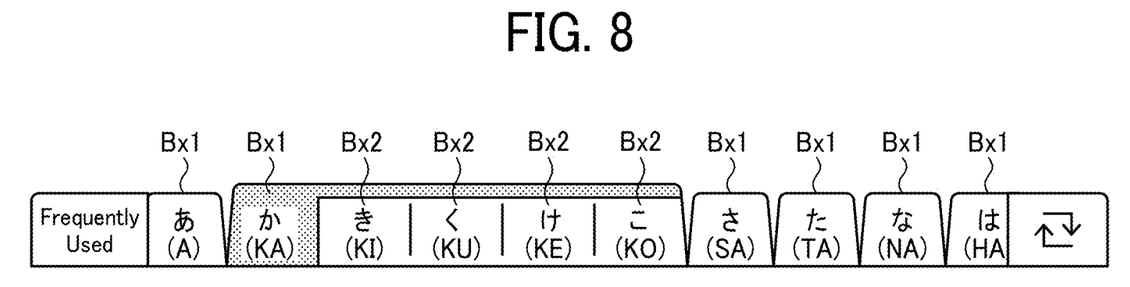
FIG. 8 is a diagram illustrating an example of a display process of initial buttons in the MFP according to embodiments of the present disclosure.

FIG. 8 is a diagram illustrating an example of a display process of initial buttons in the MFP according to embodiments of the present disclosure. With reference to FIG. 8, another example of the display process of the first initial buttons Bx1 and Bx2 in the MFP 9 according to the present embodiment is described. FIG. 8 is a diagram illustrating the initial button display area extracted from the setting screen G2.

For example, in response to the pressing of the first initial button Bx1 labeled "KA", the display control unit 302 displays, as illustrated in FIG. 8, in addition to the first initial button Bx1 labeled "KA", the second initial buttons Bx2 labeled "KI", "KU", "KE", and "KO" in the "KA" column side by side with the first initial button Bx1 labeled "KA". In this case, as illustrated in FIG. 8, the display control unit 302 may display the initial button group of the "KA" column (the first initial button Bx1 and the second initial buttons Bx2) close to the central part of the initial button display area. Then, the display control unit 302 hides the first initial button Bx1 labeled "A" on one end of the first initial button Bx1 labeled "KA" and a part of the first initial button Bx1 labeled "HA" on the other end of the first initial button Bx1 labeled "KA".

Similarly, in response to pressing of the first initial button Bx1 "SA", "TA", "NA" and the like, the display control unit 302 displays, in addition to the pressed first initial button Bx1, the second initial buttons Bx2 belonging to the column of the pressed first initial button Bx1. However, the display control unit 302 displays the second initial buttons Bx2 associated with the pressed second initial button Bx2 in the initial button display area. For example, in response to pressing of the first initial button Bx1 labeled "HA", the display control unit 302 controls the display of the second initial buttons Bx2 belonging to the "HA" column to fit within the initial button display area and the display of the first initial button Bx1 other than the "HA" column.

Figure 9:
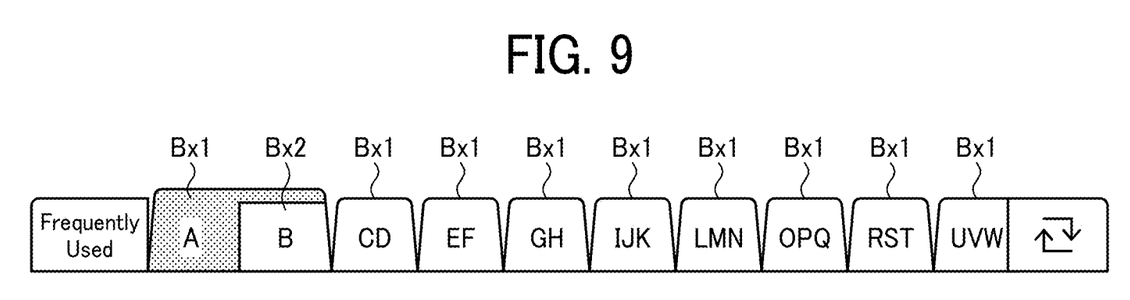
FIG. 9 is a diagram illustrating another example of the display process of the initial buttons in the MFP according to embodiments of the present disclosure.

FIG. 9 is a diagram illustrating an example of a display process of initial buttons in the MFP according to embodiments of the present disclosure. With reference to FIG. 9, another example of the display process of the first initial buttons Bx1 and Bx2 in the MFP 9 according to the present embodiment is described. Here, FIG. 9 is a diagram illustrating the initial button display area of the setting screens G1 and G2.

For example, destinations included in the address book data to be searched may include alphabets and numbers. In this case, the display control unit 302 displays the first initial buttons Bx1 labeled with letters of the alphabet in the initial button display area, as illustrated in FIG. 9. For example, in response to pressing of the first initial button Bx1 labeled "AB", the display control unit 302 integrally displays the first initial button Bx1 labeled "A" and the second initial button Bx2 labeled "B" associated with the first initial button Bx1 labeled "A" in the initial button display area. Specifically, the display control unit 302 displays the second initial button Bx2 labeled "B" on one end (for example, the right side) of the first initial button Bx1 labeled "A" with no space between the buttons Further, for example, the display control unit 302, as illustrated in FIG. 9, may display a first initial button Bx1 labeled with a plurality of initials (for example, a first initial button Bx1 labeled with two initials "C" and "D") in the initial button display area. In response to the pressing of the first initial button Bx1 labeled "CD", the display control unit 302 may integrally display the second initial button Bx2 labeled "C" and the second initial button Bx2 labeled "D" in the initial button display area. Here, any number of initials may be written on one first initial button Bx1.

In the present embodiment, an example of searching for a destination from the address book data when transmitting scan data generated by the MFP 9 to a desired destination has been described, but the present disclosure is not limited to this example. For example, when searching for a desired file from a list of files, searching for a word from a dictionary, or searching for desired data from a group of data, the first and second initial buttons Bx1, Bx2, and display process of data of name information associated with the first and second initial buttons Bx1 and Bx2 can be applied.

As described above, according to the MFP 9 of the present embodiment, the movement of the user's line of sight is reduced when searching for and narrowing down a desired destination from the address book data in the MFP 9. As a result, the user's convenience when retrieving the desired destination from the address book data in the MFP 9 is improved.

The information processing apparatus is not limited to the image forming apparatus as long as the apparatus includes a communication function.

The information processing apparatus includes, for example, an output device such as a projector (PJ), an interactive white board (IWB: a white board having an electronic whiteboard function capable of mutual communication), and a digital signage, a head up display (HUD) device, an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC, and a desktop PC.

Note that the program executed by the MFP 9 of the present embodiment is preinstalled in the ROM 902*a* or the like and provided. The program executed by the MFP 9 according to the present embodiment may be stored in a computer readable storage medium, such as a compact disc read only memory (CD-ROM), a flexible disk (FD), a compact disc recordable (CD-R), and a digital versatile disk (DVD), in an installable or executable file format for distribution.

Furthermore, the program executed by the MFP 9 according to each embodiment can be stored in a computer connected to a network such as the internet and downloaded through the network. Further, the program executed by the MFP 9 according to each embodiment can be provided or distributed through a network such as the internet.

The program executed by the MFP 9 of the present embodiment has a module configuration including the above-described units (display control unit 302, search unit 303, communication unit 305). The CPU 901 (processor) reads a program from the ROM 902*a* and executes the program, thereby loading each of the above units onto the main storage device, and generates a display control unit 302, a search unit 303, and a communication unit 305 on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
search for one or more pieces of data including name information;
receive an operation from a user;
control a user interface to display a plurality of first operation components indicating initials of the name information;
in response to the operation on a particular one of the first operation components, control the user interface to display one or more second operation components associated with the particular first operation component simultaneously with the first operation component;
in response to the operation on a particular one of the second operation components, control the user interface to display the data including the name information associated with the particular second operation component;
control to display the plurality of first operation components in a first area;
in response to the operation on the particular first operation component, control to display the one or more second operation components in the first area;
in response to the operation on the particular first operation component, hide a part of the first operation components other than the particular first operation component;
control to redisplay the first operation components other than the particular first operation component in an area where the hidden part of the first operation components was displayed; and
control to display the second operation components simultaneously with the particular first operation component in the first area.

2. The information processing apparatus of claim 1, wherein the circuitry is further configured to:
receive a selection of first data from among the data displayed on the user interface; and
transmit electronic data based on address information included in the first data.

3. The information processing apparatus of claim 1, wherein:
each of the plurality of first operation components is labeled with a character in each column of Japanese syllabary; and
each of a plurality of second operation components is labeled with a character of each row belonging to the column of the first operation component associated with a corresponding one of the plurality of second operation components.

4. The information processing apparatus of claim 1, wherein:
the circuitry is further configured to:
in response to the operation on the particular first operation component, control to display the one or more second operation components associated with the particular first operation component, at a position within the first area and adjacent to the particular first operation component.

5. The information processing apparatus of claim 1, wherein the circuitry is further configured to:
in response to the operation on the particular second operation component, control to display the data including the name information associated with the
particular second operation component in a second area
apart from the first area.

6. The information processing apparatus of claim 1,
wherein the circuitry is further configured to:
control to display each of the plurality of first operation
components so as to have a space between the adjacent
first operation components; and
in response to the operation on the particular first operation component, control to display the one or more
second operation components associated with the particular first operation component without providing the
space in between the particular first operation component.

7. The information processing apparatus of claim 1,
wherein the circuitry is further configured to:
in response to the operation on the particular first operation component, control to display each of the one or
more second operation components associated with the
particular first operation component, each second
operation component having at least a part connected to
the particular first operation component.

8. An information processing method executed by an
information processing apparatus, the method comprising:
searching for one or more pieces of data including name
information;
receiving an operation from a user;
controlling a user interface to display a plurality of first
operation components indicating initials of the name
information;
in response to the operation on a particular one of the first
operation components, controlling the user interface to
display one or more second operation components
associated with the particular first operation component
simultaneously with the first operation component;
in response to the operation on a particular one of the
second operation components, controlling the user
interface to display the data including the name information associated with the particular second operation
component;
controlling to display the plurality of first operation
components in a first area;
in response to the operation on the particular first operation component, controlling to display the one or more
second operation components in the first area;
in response to the operation on the particular first operation component, hiding a part of the first operation
components other than the particular first operation
component;
controlling to redisplay the first operation components
other than the particular first operation component in an
area where the hidden part of the first operation components was displayed; and
controlling to display the second operation components
simultaneously with the particular first operation component in the first area.

9. The method of claim 8, further comprising:
receiving a selection of first data from among the data
displayed on the user interface; and
transmitting electronic data based on address information
included in the first data.

10. The method of claim 8, wherein:
each of the plurality of first operation components is
labeled with a character in each column of Japanese
syllabary; and
each of a plurality of second operation components is
labeled with a character of each row belonging to the
column of the first operation component associated
with a corresponding one of the plurality of second
operation components.

11. The method of claim 8, further comprising:
in response to the operation on the particular first operation component, controlling to display the one or more
second operation components associated with the particular first operation component, at a position within
the first area and adjacent to the particular first operation component.

12. The method of claim 8, further comprising:
in response to the operation on the particular second
operation component, controlling to display the data
including the name information associated with the
particular second operation component in a second area
apart from the first area.

13. The method of claim 8, further comprising:
controlling to display each of the plurality of first operation components so as to have a space between the
adjacent first operation components; and
in response to the operation on the particular first operation component, controlling to display the one or more
second operation components associated with the particular first operation component without providing the
space in between the particular first operation component.

14. The method of claim 8, further comprising:
in response to the operation on the particular first operation component, control to display each of the one or
more second operation components associated with the
particular first operation component, each second
operation component having at least a part connected to
the particular first operation component.

15. A non-transitory recording medium storing a plurality
of instructions which, when executed by one or more
processors, causes the processors to perform an information
processing method comprising:
searching for one or more pieces of data including name
information;
receiving an operation from a user;
controlling a user interface to display a plurality of first
operation components indicating initials of the name
information;
in response to the operation on a particular one of the first
operation components, controlling the user interface to
display one or more second operation components
associated with the particular first operation component
simultaneously with the first operation component;
in response to the operation on a particular one of the
second operation components, controlling the user
interface to display the data including the name information associated with the particular second operation
component;
controlling to display the plurality of first operation
components in a first area;
in response to the operation on the particular first operation component, controlling to display the one or more
second operation components in the first area;
in response to the operation on the particular first operation component, hiding a part of the first operation
components other than the particular first operation
component;
controlling to redisplay the first operation components
other than the particular first operation component in an
area where the hidden part of the first operation components was displayed; and controlling to display the second operation components simultaneously with the particular first operation component in the first area.

16. The non-transitory recording medium of claim 15, wherein the method further comprises:
receiving a selection of first data from among the data displayed on the user interface; and
transmitting electronic data based on address information included in the first data.

17. The non-transitory recording medium of claim 15, wherein:
each of the plurality of first operation components is labeled with a character in each column of Japanese syllabary; and
each of a plurality of second operation components is labeled with a character of each row belonging to the column of the first operation component associated with a corresponding one of the plurality of second operation components.

18. The non-transitory recording medium of claim 15, wherein the method further comprises:
in response to the operation on the particular first operation component, controlling to display the one or more second operation components associated with the particular first operation component, at a position within the first area and adjacent to the particular first operation component.

19. The non-transitory recording medium of claim 15, wherein the method further comprises:
in response to the operation on the particular second operation component, controlling to display the data including the name information associated with the particular second operation component in a second area apart from the first area.

20. The non-transitory recording medium of claim 15, wherein the method further comprises:
controlling to display each of the plurality of first operation components so as to have a space between the adjacent first operation components; and
in response to the operation on the particular first operation component, controlling to display the one or more second operation components associated with the particular first operation component without providing the space in between the particular first operation component.

\* \* \* \* \*